United States Patent [19]

Eggers

[11] Patent Number: 4,855,196

[45] Date of Patent: Aug. 8, 1989

[54] MULTILAMINATE MATERIAL AND SEPARATOR ASSEMBLY FOR ELECTROCHEMICAL CELLS

[75] Inventor: Mark L. Eggers, Schaumburg, Ill.

[73] Assignee: KW Battery Company, Skokie, Ill.

[21] Appl. No.: 210,430

[22] Filed: Jun. 23, 1988

[51] Int. Cl.⁴ .......................... H01M 2/16; H01M 2/18
[52] U.S. Cl. ..................................... 429/139; 429/143; 429/145; 29/623.3
[58] Field of Search ............... 429/136, 139, 145, 143; 29/623.3

[56] References Cited

U.S. PATENT DOCUMENTS

| | | | |
|---|---|---|---|
| 761,345 | 5/1904 | Willard | 429/139 |
| 2,117,371 | 5/1938 | Slayter | 429/145 |
| 3,159,507 | 12/1964 | Abbe et al. | 429/145 |
| 3,625,770 | 12/1971 | Arrance et al. | |
| 3,703,417 | 11/1972 | Rosa et al. | 429/139 |
| 3,953,236 | 4/1976 | Ito et al. | |
| 4,215,186 | 7/1980 | Jaeger | 429/139 |
| 4,252,871 | 2/1981 | Sundberg | |
| 4,262,068 | 4/1981 | Kono et al. | |
| 4,275,130 | 6/1981 | Rippel et al. | |
| 4,353,969 | 10/1982 | Rippel et al. | |
| 4,418,464 | 12/1983 | DiGiacomo et al. | |
| 4,448,862 | 5/1984 | Schulte et al. | |
| 4,476,203 | 10/1984 | Robert et al. | |
| 4,618,549 | 10/1986 | Nilsson | |

Primary Examiner—Donald L. Walton
Attorney, Agent, or Firm—Thomas W. Speckman; Douglas H. Pauley

[57] ABSTRACT

A multilaminate material for separating electrodes of opposite polarity in cells and battery assemblies has at least one layer of flexible, microporous retaining mat bonded to at least one layer of semi-rigid, porous support material, and a microporous separator. A unitary multilaminate separator assembly is formed by sealing at least two opposite peripheral edges of two aligned sheets of multilaminate separator material to provide an electrode receiving slot. The separator assemblies allow continuous automated battery assembly in an efficient and safe manner.

31 Claims, 1 Drawing Sheet

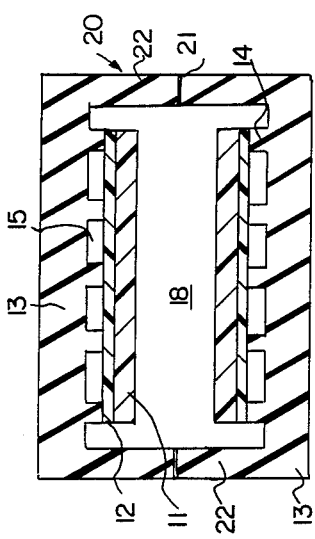
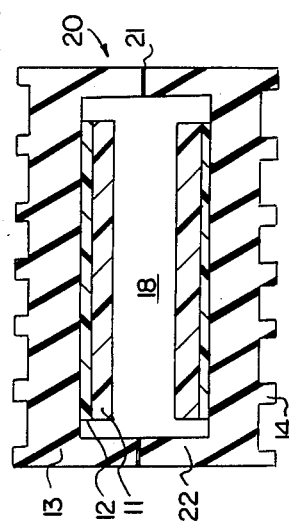
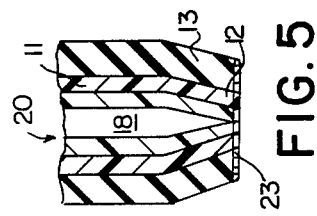
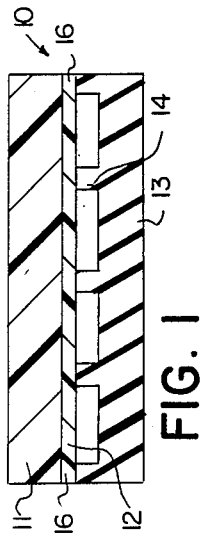
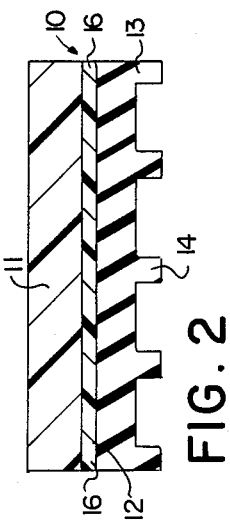
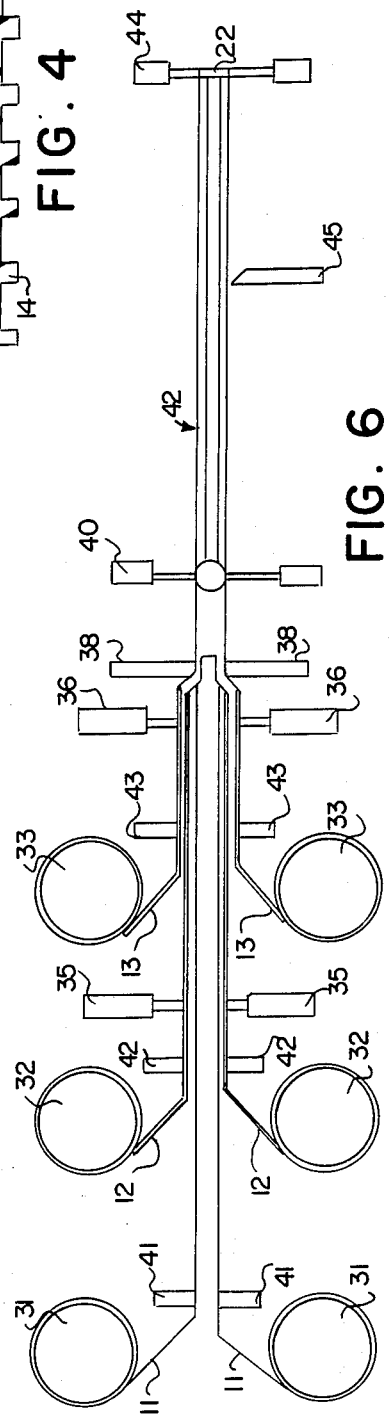

MULTILAMINATE MATERIAL AND SEPARATOR ASSEMBLY FOR ELECTROCHEMICAL CELLS

BACKGROUND OF THE INVENTION

1. Field of the Invention

The present invention relates to a multilaminate material for separating electrode of opposite polarity in electrochemical cell and battery assemblies. Two pieces of the multilaminate material may be sealed along at least two opposite peripheral edges to form a unitary multilaminate separator assembly having an electrode receiving slot. The multilaminate material of the present invention is especially suitable for use in lead-acid storage batteries. It provides improved active material retention and, thus, improves cell performance and extends cell life, and provides improved electrical insulation between electrodes of opposite polarity.

2. Description of the Prior Art

Lead acid secondary cells comprising two substantially lead electrodes in contact with sulfuric acid electrolyte are well known to the art and are utilized in a variety of applications, including starting, lighting and ignition batteries for internal combustion engines and electrical systems, stationary batteries for powering communications systems, electrical utilities, computer systems, and for providing emergency power, motive power batteries to provide power for propulsion of lift trucks, mining equipment, and the like, and special purpose batteries such as aircraft, marine, military, and small, sealed batteries for consumer use. Each of the electrodes must be provided with the appropriate active material prior to cell operation, since it is the active material which provides reactants for the reversible electrochemical reactions taking place during charge and discharge of the cell. The electrodes provide conductive support structures for the active material and serve as current collectors for the cells.

Conventional negative electrodes for use in lead-acid secondary cells comprise thin lead or lead alloy grids. The open spaces and surfaces of the grid are pasted with a paste-like mixture comprising one or more oxides of lead which are subsequently reduced, forming the electrochemically active material known as sponge lead. Positive electrodes may comprise the same type of thin lead or lead alloy grids pasted with a mixture of lead oxide compounds which are subsequently converted to the active material, lead dioxide. A battery is assembled by alternately aligning positive and negative electrodes and inserting insulating separators between and underneath the electrodes to prevent short circuiting during charging and operation.

Pasted electrodes for use in lead-acid storage batteries are conventionally wrapped with multiple layers of porous materials prior to battery assembly to provide improved retention of the active material within the grid and improved electrical insulating properties. The multiple layers of porous materials are typically applied to the electrodes manually by wrapping each layer around the pasted grid electrode in a specified orientation. Typically, a first layer of porous retainer mat, such as non-woven fiberglass mat, is wrapped around the pasted grid electrode horizontally, and a second layer of porous retainer mat is wrapped around the pasted grid electrode vertically. A plastic boot may then be affixed at the bottom of the plate to electrically insulate the bottom edge of the plate. Some prior art processes utilize a third layer of perforated plastic material manually wrapped around the electrode to hold the retainer mat in place and to electrically insulate the side edges of the electrode. Separators are then inserted between electrodes during battery assembly. The primary disadvantage of conventional battery wrapping techniques is that they are tremendously time consuming and labor intensive. In addition, they require extensive handling of the pasted grids which are fragile and comprise harmful lead components.

U.S. Pat. No. 4,418,464 teaches an apparatus for wrapping plates with three layers of acid resistant, flexible, porous materials. The apparatus first wraps a layer of Retent-A-Tape around the electrode in a top to bottom orientation with respect to the front and back faces of the plate, and the tape is clamped in place with an elastomeric boot. The apparatus then wraps a precut double layer comprising a first layer of fiberglass mat and a second layer of Koroseal around the electrode in a side to side orientation with respect to the electrode faces. The Koroseal layer is slightly larger than the glass mat layer, overlapping edges of the Koroseal are sealed after application, and the bottom edge of the Koroseal layer is then bonded to the boot. The apparatus taught by the '464 patent is designed to overcome many of the deficiencies of the prior art methods which are described above by replacing manual wrapping with an automated wrapping process. The automated process of the '464 patent, however, requires complex machinery, and requires application of the separators separately from and subsequent to the wrapping operation.

U.S. Pat. No. 4,448,862 teaches coating conventional microporous separators for lead-acid storage batteries with a porous glass wool mat on the side facing the negative electrode to promote electrolyte exchange and prevent crumbling of the active material. A glass wool mat may be applied as a layer to the separator, or it may be formed as a pocket into which the negative electrode may be inserted. U.S. Pat. No. 4,353,969 teaches a quasibipolar battery wherein the separator assembly comprises a separator substrate bonded to loosely woven glass mats on both faces, the glass mats attached to at least one layer of scrim fabric providing reinforcement of the pasted active material and support for the separator-plate assembly. U.S. Pat. No. 3,625,770 teaches a flexible battery separator in the form of an envelope for high energy density batteries, the separator envelope comprising asbestos impregnated with polyphenylene oxide (PPO) to which a composite zirconia-based flexible inorganic separator film is applied.

U.S. Pat. No. 4,476,203 teaches lead-acid battery cells wherein separation of electrode plates is achieved by successive separator elements, including a microporous flat layer adjacent an undulating and perforated spacing element which is adjacent to a fibrous mat. U.S. Pat. No. 3,953,236 teaches a laminated cell structure comprising a positive plate with active material, a fibrous structure adjacent both faces of the positive plate, and a separator layer comprising a microporous sheet between the fibrous layers and the negative electrodes. U.S. Pat. No. 4,618,549 teaches utilizing a retainer mat in addition to the conventional separator to prevent shedding of active material and to prevent the distribution of leady dust during curing. U.S. Pat. No. 4,252,871 teaches a tubular support sleeve for tubular plate electrodes in the form of a seamless helical tubular lattice structure comprising fusible flat reinforced thermoplastic tapes. The '871 patent also teaches the use of a braided glass thread layer supported by an outer sheet of perforated plastic, such as polyvinyl chloride (PVC). U.S. Pat. No. 4,262,068 teaches a maintenance-free lead-acid battery having a separator comprising a double layer of glass fibers and a porous member. U.S. Pat. No. 4,275,130 teaches a bipolar battery comprising microporous, thermoplastic separators having porous, resilient mats bonded thereto to carry the active material.

None of the prior art methods or apparatus achieves effective retention of the active material on the electrode grids in combination with a simplified, economically feasible assembly operation. Prior art manual battery wrapping techniques are labor intensive, delicate, and environmentally unsafe, while prior art automated techniques require complex, expensive machinery. Prior art multilaminate materials have not demonstrated improved retention of active material resulting in superior performance and enhanced cell operating lifetime.

SUMMARY OF THE INVENTION

It is an objective of the present invention to provide a multilaminate material for separating electrodes of opposite polarity in cells and battery assemblies.

It is another objective of the present invention to provide a unitary multilaminate separator assembly comprising two pieces of multilaminate material forming a separator sleeve or pocket into which an electrode plate may be inserted in a simplified manual or automated battery assembly operation.

It is yet another objective of the present invention to provide a multilaminate separator assembly providing effective retention of active material on electrode grids, and resulting in superior cell performance and enhanced cell lifetime.

It is yet another objective of the present invention to provide a continuous process for fabricating the multilaminate material and sleeves or pockets thereof.

It is still another objective of the present invention to provide a process for continuous fabrication of the multilaminate material and separator assembly.

The multilaminate material of the present invention comprises at least one layer of flexible, microporous retaining mat; at least one layer of semi-rigid, porous supporting material; and a microporous separator which serves to electrically insulate electrodes of opposite polarity. The central layer of semi-rigid, porous supporting material provides support for and prevents deformation of the flexible, microporous retaining mat, and thus prevents shedding of active material from the electrode plate during cell charging and operation. The semi-rigid supporting material is sufficiently rigid to prevent sagging of the flexible retaining mat between ribs of ribbed the present invention is formed by sealing two or three edges of two aligned sheets of the multilaminate separator material to provide an electrode receiving slot into which an electrode plate may be inserted. The microporous separator is preferably ribbed, and the multilaminate material may be fabricated with the ribs directed toward or away from the other component layers. Multilaminate separator assemblies are preferably fabricated with the ribs of each microporous separator oriented toward the electrode receiving slot for use with positive electrode plates. Multilaminate separator assemblies may also be fabricated with the ribs of each microporous separator oriented outwardly for use with negative electrode plates.

The present invention also provides a process for fabrication of the multilaminate separator material wherein at least one layer of flexible, microporous retaining mat is bonded to a layer of semi-rigid, porous supporting material, and the semi-rigid, porous supporting material is then bonded to the microporous separator. Although several different methods of material bonding may be utilized in the fabrication process of the present invention, ultrasonic bonding methods are preferred, because ultrasonic bonding may produce bonds which are substantially as strong as the component materials themselves. Fabrication of the multilaminate separator material preferably proceeds continuously, and cutting and sealing two form multilaminate separator assemblies also preferably proceeds continuously. It is preferred to form trilaminate separation assemblies which are sealed on three sides which eliminates the need for a separate bottom insulator as is required by present practice.

Utilizing the multilaminate separator assemblies of the present invention battery assembly may be achieved in a continuous manual or automated operation, completely eliminating the present wrapping process as a distinct manufacturing step. Pasted electrode plates may be inserted into unitary multilaminate separator assemblies in a process which is time efficient and reduces human exposure to harmful lead components. Battery assembly may then be achieved simply by alternately aligning pasted electrode plates retained in separator assemblies with electrode plates of opposite polarity. Typically, disintegration and shedding of active material is more prevalent at the positive electrode due to the electrochemistry of lead-acid cells. For this reason, it is preferred that multilaminate separator assemblies are mounted on the positive electrodes. The positive electrode plates retained in multilaminate separator assemblies may then be alternately aligned with negative electrode plates during battery assembly. If tubular plate positive electrode plates are being used with negative electrode plates, negative electrode plates retained in separator assemblies may simply be alternately aligned with tubular plate positive electrodes.

BRIEF DESCRIPTION OF THE DRAWINGS

Further features of the present invention will be apparent from the following more detailed description of the invention read in conjunction with the drawings, wherein:

FIG. 1 shows a cross-sectional view of one embodiment of the multilaminate separator material of the present invention;

FIG. 2 shows a cross-sectional view of another embodiment of the multilaminate separator material of the present invention;

FIG. 3 shows a cross-sectional view of one embodiment of the multilaminate separator assembly comprising two sheets of multilaminate separator material bonded together;

FIG. 4 shows a cross-sectional view of another embodiment of the multilaminate separator assembly comprising two sheets of multilaminate separator material bonded together;

FIG. 5 shows a cross-sectional view of a bottom portion of the multilaminate separator assembly of the present invention; and FIG. 6 illustrates schematically the process for fabricating the multilaminate separator material and forming sleeves or pockets thereof.

DESCRIPTION OF PREFERRED EMBODIMENTS

As shown in FIGS. 1 and 2, multilaminate separator material 10 comprises at least one layer of flexible, microporous retaining mat 11; at least one layer of semi-rigid, porous supporting material 12; and at least one microporous separator 13. Flexible, microporous retaining mat 11 may comprise a woven or non-woven acid-resistant material which is resistant to about 10 to about 90 percent sulfuric acid and the oxidizing potential of the positive electrode. Suitable materials comprise polyester, polyethylene, polypropylene and silicate glasses. Polyesters are preferred materials. The retaining mat preferably comprises a non-woven or woven mat having a porosity of about 60 percent to about 95 percent and a thickness of about 0.025 inch to about 0.080 inch. Flexible, porous retaining mat 11 is laminated to semi-rigid, porous supporting material 12 having a porosity of about 50 percent to about 90 percent and a thickness of about 0.005 inch to about 0.020 inch. By the term "semi-rigid material" as used throughout this disclosure and claims with respect to the porous supporting material 12, I mean a material which is sufficiently flexible to be coiled in three inch or larger coils while being sufficiently rigid to resist appreciable deformation over unsupported spans of one inch or less. Suitable semi-rigid supporting materials comprise polyethylene, polystyrene, polyvinyl chloride and ABS copolymers. Semi-rigid, porous supporting material 12 preferably comprises a polyvinyl chloride (PVC) sheet sold under the trademark Koroseal. Semi-rigid porous supporting material 12 preferably has perforations over at least a substantial portion of its surface area, and preferably has solid, non-perforated bands 16 at both longitudinal edges to provide improved sealing to the other layers. Semi-rigid, porous supporting material 12 is laminated to microporous separator 13 having a porosity of about 50 percent to about 95 percent and a thickness of about 0.020 inch to about 0.25 inch. Microporous separator 13 may comprise materials such as polyethylene, polyvinyl chloride, polyester, rubber or polypropylene, and separator 13 preferably comprises a microporous polyethylene separator sold under the trademark Daramic. The retaining mat, the semi-rigid supporting material, and the microporous separator may be the same or different materials. Microporous separator 13 preferably has ribs 14 spaced at regular intervals on at least one surface, and multilaminate material 10 may be fabricated with ribs 14 of microporous separator 13 oriented toward the other component layers, as shown in FIG. 1 for use with positive electrode plates, or ribs 14 of microporous separator 13 may be oriented outwardly, as shown in FIG. 2, for use with negative electrode plates.

The component layers of multilaminate material 10 may be substantially coextensive, as shown in FIGS. 1 and 2. It is preferred, however, for many applications, to provide porous retaining mat 11 and porous supporting material 12 having substantially the same width bonded to separator 13 having a greater width, as shown in FIGS. 3 and 4. The inner component layers are preferably arranged generally centrally with respect to the longitudinal edges of separator 13. Separators 13 may additionally be provided with enlarged sealing flanges 22 directed toward the inner component layers to facilitate sealing of two sheets of multilaminate material at the longitudinal edges to form a multilaminate separator assembly.

Although the multilaminate material is shown to have single thicknesses of each component layer, and this embodiment is preferred for most applications, it may be desirable for some applications to provide multiple layers of retaining mat 11 and/or supporting material 12. When multiple component layers are utilized, the sequence of component layers described above and illustrated pertains.

Multiple component layers forming multilaminate material 10 may be sealed to one another by means known to the art, such as heat sealing, adhesives, solvents, mechanical bonding, ultrasonic bonding, or combinations thereof. Ultrasonic bonding is a preferred method for sealing the multiple layers to one another according to the present invention. Suitable ultrasonic seals may be obtained using commercially available ultrasonic welding equipment providing a welding power of about 500 to about 2000 watts and operated to achieve weld times of about 0.05 to about 1.0 second. The sealing operation is described in greater detail below in accordance with the preferred process for fabricating multilaminate separator material and separator assemblies. In accordance with the embodiments shown in FIGS. 3 and 4, enlarged sealing flanges 22 of separators 13 form edge sealing regions of multilaminate separator assemblies 20.

FIG. 3 shows unitary multilaminate separator assembly 20 of the present invention comprising two sheets of multilaminate separator material 10 bonded together at assembly edge seals 21 to form electrode receiving slot 18 sized for insertion of an electrode plate. The multilaminate separator assembly may additionally be sealed at its bottom edge to form a pocket for receiving an electrode plate. FIG. 3 illustrates an embodiment wherein ribs 14 are oriented toward the other component layers and provide a plurality of electrolyte reservoirs 15. This embodiment is preferred for use with positive electrodes. FIG. 4 shows multilaminate separator assembly 20 with ribs 14 of microporous separator 13 oriented on exterior faces of the multilaminate separator assembly. This embodiment of separator assembly 20 is preferred for use with negative electrodes.

FIG. 5 illustrates a preferred embodiment of separator assembly 20 wherein a third edge of the two sheets of multilaminate material is sealed to provide a pocket-like assembly. Since the component layers are coextensive at this point, bottom seal 23 extends through the component layers of each sheet of multilaminate material. The parallel edge seals of multilaminate separator assembly 20 may extend through the component layers of each sheet of multilaminate material in a similar fashion in embodiments where all component layers are substantially coextensive.

FIG. 6 illustrates schematically a preferred process for fabricating the multilaminate separator material and sleeves or pockets thereof according to the present invention. Two continuous pieces of multilaminate separator material are preferably formed simultaneously, as shown. Flexible porous retaining mat rollstocks 31 provide continuous sheets of retaining mat 11, preferably in the width required for a particular application. Alignment and feed means 41 continuously aligns and feeds retaining mat 11 during fabrication. Likewise, alignment and feed means 42 continuously feeds semi-rigid supporting material 12 from semi-rigid porous supporting material rollstocks 32 and aligns semi-rigid supporting material 12 with retaining mat 11. Ultrasonic sealing means 35 are preferably continuously activated to seal at least the two continuous longitudinal edges of semi-rigid supporting material 12 to retaining mat 11. Alignment and feed means 43 continuously feeds microporous separator 13 from microporous separator rollstock 33 and aligns microporous separator 13 with the bonded multilaminate material previously formed. Ultrasonic sealing means 36 are preferably continuously activated to seal at least the two parallel continuous edges of microporous separator 13 to semi-rigid supporting material 12. Pocket forming guides 38 align the two multilaminate separator sheets, and bring them into abutting contact. Ultrasonic sealing means 40 continuously bonds both continuous longitudinal edges of the two multilaminate separator sheets together to form a continuous sleeve 42. Shear trimmer 44 cuts the edge-bonded multilaminate sleeves to predetermined lengths, and ultrasonic sealing means 44 may be provided to seal one transverse edge 22 of the multilaminate sleeves, if desired, to form pockets sealed along three edges.

While the fabrication process has been described above with reference to ultrasonic sealing means, it should be recognized that any means of bonding known to the art, such as adhesive, solvent, heat sealing, mechanical bonding, or combinations thereof may be used. In some applications, it may be desirable to provide multiple layers of one or more of the multilaminate component materials, and this may be accomplished simply by providing additional rollstocks of the desired material and suitably positioning additional alignment and feed means and sealing means.

The following specific examples are set forth in detail for illustrative purposes and should not be considered as limiting the invention in any way.

EXAMPLE I (Comparative)

A battery having conventional electrode wrapping as known to the art was constructed of negative plates each having a grid of 375 gms, 4.75 percent antimonial lead, 0.17 inch thick pasted with 750 gms (wet basis) leady oxide paste having a wet density of 75 gms/in$^3$; six positive plates each having a grid of 607 gms, 4.75 percent antimonial lead, 0.250 inch thick pasted with 965 gms (wet basis) leady oxide paste having a wet density of 70 gms/in$^3$ with a first vertically wrapped layer of glass mat, a second horizontally wrapped layer of glass mat, a third horizontally wrapped layer of Koroseal, and a plastic bottom insulator (boot); separators between alternating positive and negative plates of Daramac (W. R. Grace) 0.100 inch thick; and electrolyte of 1.285 specific gravity

EXAMPLE II

A battery having a multilaminate pocket separator assembly according to this invention was constructed of seven negative plates each having a grid of 375 gms, 4.75 percent antimonial lead 0.170 inch thick pasted with 750 gms (wet basis) leady oxide paste having a wet density of 75 gms/in$^3$; six positive plates each having a grid of 607 gms 4.75 percent antimonial lead 0.250 inch thick pasted with 965 gms (wet basis) leady oxide paste having a wet density of 70 gms/in$^3$ within a multilaminate pocket of a first layer of glass mat, a second layer of koroseal, and a third layer of Daramac (W. R. Grace) 0.100 inch thick; and electrolyte of 1.285 specific gravity (77° F.) sulfuric acid. The cells were skimmed, since the glass mat layer was thinner than in Example I, to ensure that the cells of Examples 1 and II experienced the same degree of compression, as necessary for comparability.

EXAMPLE III

The batteries constructed according to Examples I and II were subjected to accelerated cycle tests: discharge to 120 percent of six hour rated capacity each cycle; and charge to 120 percent of amp-hours removed on discharge for two hours at 2.9 hr. rate (114 amps) and ten hours 48 minutes at 14.4 hr. rate (23 amps).

Mean values of output measurements as compared to rated capacities made from 600 to 1000 effective cycles are summarized in the following table:

TABLE 1

| Effective Cycles | Mean Percent Rated Capacity | |
|---|---|---|
| | Conventional Wrap Example I (Comparative) | Multilaminate Separator Assembly Example II |
| 600 | 113.0 | 105.7 |
| 800 | 106.0 | 100.2 |
| 1000 | 98.5 | 94.6 |

It is seen from Table 1 that the reduction in output of the conventional wrapped electrode with cycling is 12.8 percent while the reduction in the multilaminate separator assembly of this invention is 10.5 percent, or 18 percent less reduction in battery output, over the cycle range measured.

The capacity in this test was lower with the multilaminate separator assembly due to reduced acid availability. This has been overcome in more recent work by increasing the thickness of the separator with the result that capacity of the multilaminate separator assembly batteries is equivalent to or higher than conventional wrap batteries.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

I claim:

1. A multilaminate material for separating electrodes of opposite polarity in cells and battery assemblies, said multilaminate material comprising:
    at least one layer of flexible, microporous retaining mat to prevent shedding of active electrode material;
    at least one layer of semi-rigid, porous supporting material bonded on one side to said at least one layer of flexible, microporous retaining mat; and
    at least one microporous separator to electrically insulate said electrode of opposite polarity bonded to the opposite side of at least one layer of semi-rigid, porous supporting material.

2. A multilaminate material for separating electrodes of opposite polarity in cells and battery assemblies according to claim 1 wherein said microporous separator has at least one ribbed surface.

3. A multilaminate material for separating electrodes of opposite polarity in cells and battery assemblies according to claim 2 wherein said ribbed surface of said microporous separator is oriented toward said at least one layer of semi-rigid, porous supporting material.

4. A multilaminate material for separating electrodes of opposite polarity in cells and battery assemblies according to claim 2 wherein said microporous separator has a substantially flat surface opposite said ribbed surface.

5. A multilaminate material for separating electrodes of opposite polarity in cells and battery assemblies according to claim 4 wherein said substantially flat surface of said microporous separator is oriented toward said at least one layer of semi-rigid, porous supporting material.

6. A multilaminate material for separating electrodes of opposite polarity in cells and battery assemblies according to claim 1 wherein said at least one layer of flexible, microporous retaining mat, said at least one layer of semi-rigid, porous supporting material, and said at least one microporous separator are substantially coextensive.

7. A multilaminate material for separating electrodes of opposite polarity in cells and battery assemblies according to claim 1 wherein said at least one microporous separator is wider than the other said layers and has two longitudinal edges extending perpendicular to the surface of said separator.

8. A multilaminate material for separating electrodes of opposite polarity in cells and battery assemblies according to claim 7 wherein said microporous separator has an enlarged sealing flange at each said longitudinal edge, and each said enlarged sealing flange is directed toward the other said layers.

9. A multilaminate material for separating electrodes of opposite polarity in cells and battery assemblies according to claim 1 wherein said flexible, microporous retaining mat comprises a non-woven polyester mat, and said semi-rigid porous supporting material comprises a perforated polyvinyl chloride sheet.

10. A multilaminate material for separating electrodes of opposite polarity in cells and battery assemblies according to claim 9 wherein said separator comprises polyethylene.

11. A multilaminate material for separating electrodes of opposite polarity in cells and battery assemblies according to claim 1 wherein said retaining mat has a porosity of about 60 to about 95 percent, is about 0.025 to about 0.080 inch thick and is a material selected from the group consisting of polyester, polyethylene, polypropylene, and silicate glasses.

12. A multilaminate material for separating electrodes of opposite polarity in cells and battery assemblies according to claim 11 wherein said supporting material has a porosity of about 50 to about 90 percent, is about 0.005 to about 0.020 inch thick and is a material selected from the group consisting of polyethylene, polystyrene, polyvinyl chloride and ABS copolymers.

13. A multilaminate material for separating electrodes of opposite polarity in cells and battery assemblies according to claim 12 wherein said separator has a porosity of about 50 to about 95 percent, is about 0.020 to about 0.25 inch thick and is selected from the group consisting of polyethylene, polyvinyl chloride, polyester, rubber, and polypropylene.

14. A multilaminate material for separating electrodes of opposite polarity in cells and battery assemblies according to claim 1 wherein said supporting material has a porosity of about 50 to about 90 percent, is about 0.005 to about 0.020 inch thick and is a material selected from the group consisting of polyethylene, polystyrene, polyvinyl chloride and ABS copolymers.

15. A multilaminate material for separating electrodes of opposite polarity in cells and battery assemblies according to claim 1 wherein said separator has a porosity of about 50 to about 95 percent, is about 0.020 to about 0.25 inch thick and is selected from the group consisting of polyethylene, polyvinyl chloride, polyester, rubber, and polypropylene.

16. A multilaminate material for separating electrodes of opposite polarity in cells and battery assemblies according to claim 1 wherein said retaining mat is polyester, said supporting material is polyvinyl chloride, and said separator is polyethylene.

17. A unitary multilaminate separator assembly for separating electrodes of opposite polarity in cells and battery assemblies comprising two pieces of a multilaminate material having substantially the same dimension sealed along at least two opposite peripheral edges to form an electrode receiving slot, each said piece of multilaminate material comprising at least one layer of flexible, microporous retaining mat, at least one layer of semi-rigid, porous supporting material bonded to said at least one layer of flexible, microporous retaining mat, and at least one microporous separator bonded to said at least one layer of semi-rigid, porous supporting material.

18. A unitary multilaminate separator assembly for separating electrodes of opposite polarity in cells and battery assemblies according to claim 17 wherein said two pieces of multilaminate material are arranged to provide each said microporous separator at an exterior face of the separator assembly.

19. A unitary multilaminate separator assembly for separating electrodes of opposite polarity in cells and battery assemblies according to claim 17 wherein said two pieces of multilaminate material are arranged to provide each said flexible microporous retaining mat at an interior face of the separator assembly.

20. A unitary multilaminate separator assembly for separating electrodes of opposite polarity in cells and battery assemblies according to claim 17 wherein said two pieces of multilaminate material are additionally sealed along a third peripheral edge.

21. A unitary multilaminate separator assembly for separating electrodes of opposite polarity in cells and battery assemblies according to claim 17 wherein said microporous separator has at least one ribbed surface.

22. A unitary multilaminate separator assembly for separating electrodes of opposite polarity in cells and battery assemblies according to claim 21 wherein said two pieces of multilaminate material are arranged to provide said ribbed surface of each said microporous separator at an exterior face of the separator assembly.

23. A unitary multilaminate separator assembly for separating electrodes of opposite polarity in cells and battery assemblies according to claim 21 wherein said two pieces of multilaminate material are arranged to orient said ribbed face of each said microporous separator toward said electrode receiving slot.

24. A unitary multilaminate separator assembly for separating electrodes of opposite polarity in cells and battery assemblies according to claim 17 wherein each said microporous separator is wider than the other said layers and has two longitudinal edges.

25. A unitary multilaminate separator assembly for separating electrodes of opposite polarity in cells and battery assemblies according to claim 24 wherein each said microporous separator has an enlarged sealing flange at each said longitudinal edge, each said enlarged sealing flange is directed toward the other said layers, and said two pieces of multilaminate material are sealed along said enlarged sealing flanges.

26. A unitary multilaminate separator assembly for separating electrodes of opposite polarity in cells and battery assemblies according to claim 25 wherein said two pieces of multilaminate material are additionally sealed along a third peripheral edge.

27. A unitary multilaminate separator assembly for separating electrodes of opposite polarity in cells and battery assemblies according to claim 17 wherein said flexible, microporous retaining mat comprises a non-woven polyester mat, and said semi-rigid porous supporting material comprises a perforated polyvinyl chloride sheet.

28. A process for encasing an electrode for electrochemical cells and battery assemblies comprising:
 forming an electrode receiving slot between two pieces of a multilaminate material, said multilaminate material comprising at least one layer of flexible, microporous retaining mat; at least one layer of semi-rigid, porous supporting material bonded to said at least one layer of one microporous separator bonded to said at least one layer of semi-rigid, porous supporting material, spacing said retaining mat of one piece of said laminate material from and facing said retaining mat of the second piece of said laminate material;
 sealing at least two opposite peripheral edges of said two pieces of multilaminate material to form said electrode receiving slot; and
 inserting an electrode together with any electrochemically active material into said receiving slot.

29. A process according to claim 28 wherein said sealing is ultrasonic sealing.

30. A continuous process for preparing a multilaminate material and unitary multilaminate separator assemblies for separating electrochemical cell and battery electrodes, said process comprising:
 supplying two microporous retaining mat sheets opposing each other in a separated relation;
 supplying a semi-rigid supporting sheet to the exterior of and in contacting relation to at least a portion of each said retaining mat sheet;
 sealing each said supporting sheet to its corresponding retaining mat sheet forming a dilaminate sheet;
 supplying a separator sheet to the exterior of and in contacting relation to at least a portion of each said dilaminate sheet;
 sealing each said separator sheet to its corresponding said dilaminate sheet forming a trilaminate sheet;
 passing two opposing said trilaminate sheets through pocket forming means forming and sealing longitudinal sides of said opposing trilaminate sheets to form a pocket for one of said electrodes;
 cutting said opposing trilaminate sheets to a desired said pocket length; and
 sealing one open end of said opposing trilaminate sheets forming a unitary trilaminate separator assembly having an electrode pocket closed on three sides.

31. A continuous process according to claim 30 wherein said sealing is ultrasonic sealing.

* * * * *